(12) United States Patent
Masumoto et al.

(10) Patent No.: US 12,339,187 B2
(45) Date of Patent: Jun. 24, 2025

(54) CHAIN MEASUREMENT DEVICE, CHAIN MEASUREMENT SYSTEM, AND METHOD FOR CALCULATING SLACK AMOUNT OF CHAIN

(71) Applicant: DAIDO KOGYO CO., LTD., Ishikawa (JP)

(72) Inventors: Daigo Masumoto, Ishikawa (JP); Tadashi Sekido, Ishikawa (JP); Yoshiaki Sawade, Ishikawa (JP); Naoto Himiyama, Ishikawa (JP); Sora Demura, Ishikawa (JP)

(73) Assignee: DAIDO KOGYO CO., LTD., Ishikawa (JP)

( * ) Notice: Subject to any disclaimer, the term of this patent is extended or adjusted under 35 U.S.C. 154(b) by 0 days.

(21) Appl. No.: 18/542,973

(22) Filed: Dec. 18, 2023

(65) Prior Publication Data

US 2024/0118153 A1 Apr. 11, 2024

Related U.S. Application Data

(63) Continuation of application No. PCT/JP2022/017404, filed on Apr. 8, 2022.

(30) Foreign Application Priority Data

Jun. 24, 2021 (JP) ................. 2021-105177

(51) Int. Cl.
*G01L 5/101* (2020.01)
*F16H 7/00* (2006.01)
*F16H 7/06* (2006.01)

(52) U.S. Cl.
CPC ............... *G01L 5/101* (2013.01); *F16H 7/00* (2013.01); *F16H 7/06* (2013.01)

(58) Field of Classification Search
CPC .............. F16H 7/00; F16H 7/06; G01L 5/101
(Continued)

(56) References Cited

U.S. PATENT DOCUMENTS

2014/0136140 A1* 5/2014 Chan ................. H02G 7/14
702/141
2022/0003636 A1* 1/2022 Monty ................. G01B 21/16

FOREIGN PATENT DOCUMENTS

CN 206813891 12/2017
GB 2501303 A * 10/2013 ............ B63B 21/20
(Continued)

OTHER PUBLICATIONS

Translation_JP2005140534.pdf (Year: 2005).*
International Search Report issued Jun. 28, 2022 in International (PCT) Application No. PCT/JP2022/017404.

*Primary Examiner* — Peter J Macchiarolo
*Assistant Examiner* — Monica S Young
(74) *Attorney, Agent, or Firm* — Wenderoth, Lind & Ponack, L.L.P.

(57) ABSTRACT

A chain measurement device is for measuring a slack amount of a chain wound around sprockets. The chain measurement device includes a main body portion including an acceleration sensor, and an attachment portion configured to attach the main body portion to the chain. The acceleration sensor is configured to detect acceleration in a gravitational direction in a case where the main body portion attached to the chain is lifted upward within a range of the slack amount of the chain and then dropped.

14 Claims, 11 Drawing Sheets

(58) Field of Classification Search
USPC .................................................. 73/862.391
See application file for complete search history.

(56) References Cited

FOREIGN PATENT DOCUMENTS

| | | | |
|---|---|---|---|
| JP | 61-42401 | 2/1986 | |
| JP | H09257466 A * | 10/1997 | |
| JP | H1182650 A * | 3/1999 | |
| JP | 2005-140534 | 6/2005 | |
| JP | 2005-140535 | 6/2005 | |
| JP | 2005140534 A * | 6/2005 | |
| JP | 2018087422 A * | 6/2018 | |
| JP | 6604615 B2 * | 11/2019 | ........... B66B 25/006 |

* cited by examiner

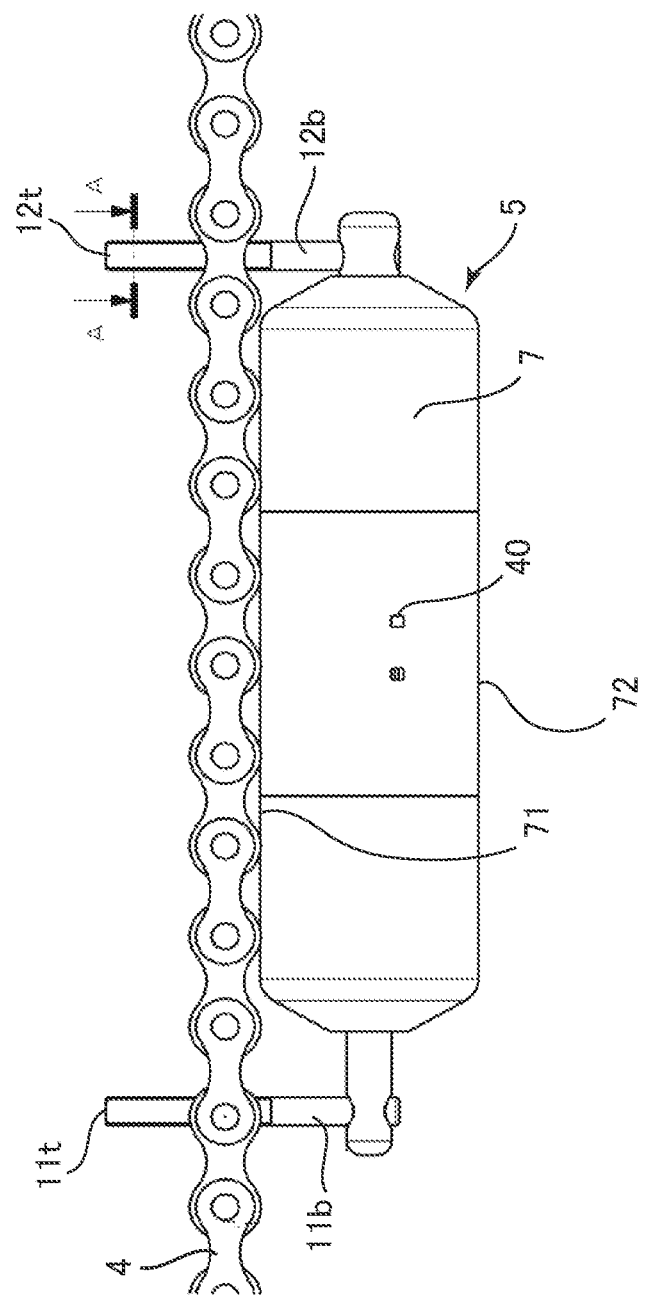

CHAIN MEASUREMENT DEVICE, CHAIN MEASUREMENT SYSTEM, AND METHOD FOR CALCULATING SLACK AMOUNT OF CHAIN

CROSS-REFERENCE TO RELATED APPLICATIONS

This application is a Continuation of International Patent Application No. PCT/JP2022/017404, filed Apr. 8, 2022, which claims the benefit of Japanese Patent Application No. 2021-105177, filed Jun. 24, 2021, both of which are hereby incorporated by reference herein in their entirety.

BACKGROUND OF THE INVENTION

Field of the Invention

The present invention relates to a chain measurement device, a chain measurement system, and a method for calculating a slack amount of a chain.

Description of the Related Art

In the case of a chain, such as a drive chain, elongation of the chain is measured to determine the life of the chain. In addition, in order to stretch the chain within an appropriate range, a slack amount of the chain is measured. The elongation of the chain and the slack amount of the chain are generally measured by an operator using a caliper or a dedicated tool (see Japanese Patent Application No. 61-42401).

However, in a case where the chain is measured with the caliper described above, measurement accuracy varies among operators. In addition, in the case of using the dedicated tool as illustrated in Japanese Patent Application No. 61-42401, although the accuracy is improved as compared with the caliper, the operator still has to visually measure the chain, and there is room for aiming at further improvement from the viewpoint of measurement accuracy and workability.

SUMMARY OF THE INVENTION

The present invention provides a chain measurement device, a chain measurement system, and a method for calculating a slack amount of a chain capable of measuring a chain easily and with high accuracy.

According to one aspect of the present invention, a chain measurement device for measuring a slack amount of a chain wound around sprockets, the chain measurement device includes a main body portion including an acceleration sensor configured to detect acceleration in a gravitational direction, and an attachment portion configured to attach the main body portion to the chain, wherein the acceleration sensor is configured to detect acceleration in the gravitational direction in a case where the main body portion attached to the chain is lifted upward within a range of a slack amount of the chain and then dropped.

Further features of the present invention will become apparent from the following description of exemplary embodiments with reference to the attached drawings.

BRIEF DESCRIPTION OF THE DRAWINGS

FIG. 3B is a side view illustrating the chain measurement device attached to the chain.

DESCRIPTION OF THE EMBODIMENTS

Schematic Configuration of Chain Measurement System

Figure 1:
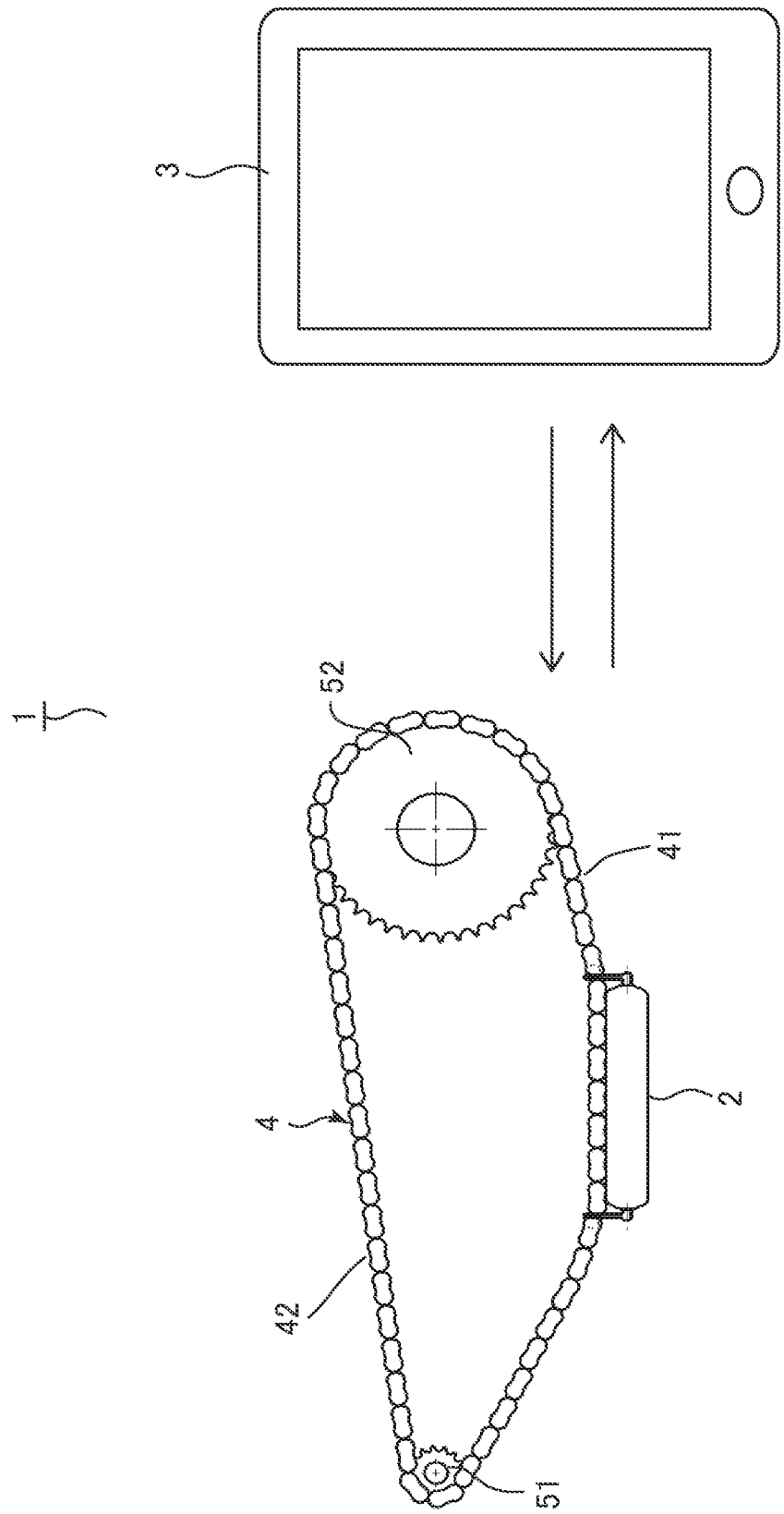
FIG. 1 is a schematic view illustrating a chain measurement system according to an embodiment of the present invention.

Hereinafter, a chain measurement system 1 according to an embodiment of the present invention will be described with reference to FIGS. 1 to 9. As illustrated in FIG. 1, a chain measurement system 1 includes a chain measurement device 2 attached to a chain 4 and a terminal device 3 such as a smartphone. The chain measurement device 2 and the terminal device 3 are configured to be able to perform wireless communication, and the terminal device 3 is configured to determine the life of the chain 4 and the amount of slack (looseness) of the chain 4 based on data measured by the chain measurement device 2.

Configuration of Chain Measurement Device

Figure 2:
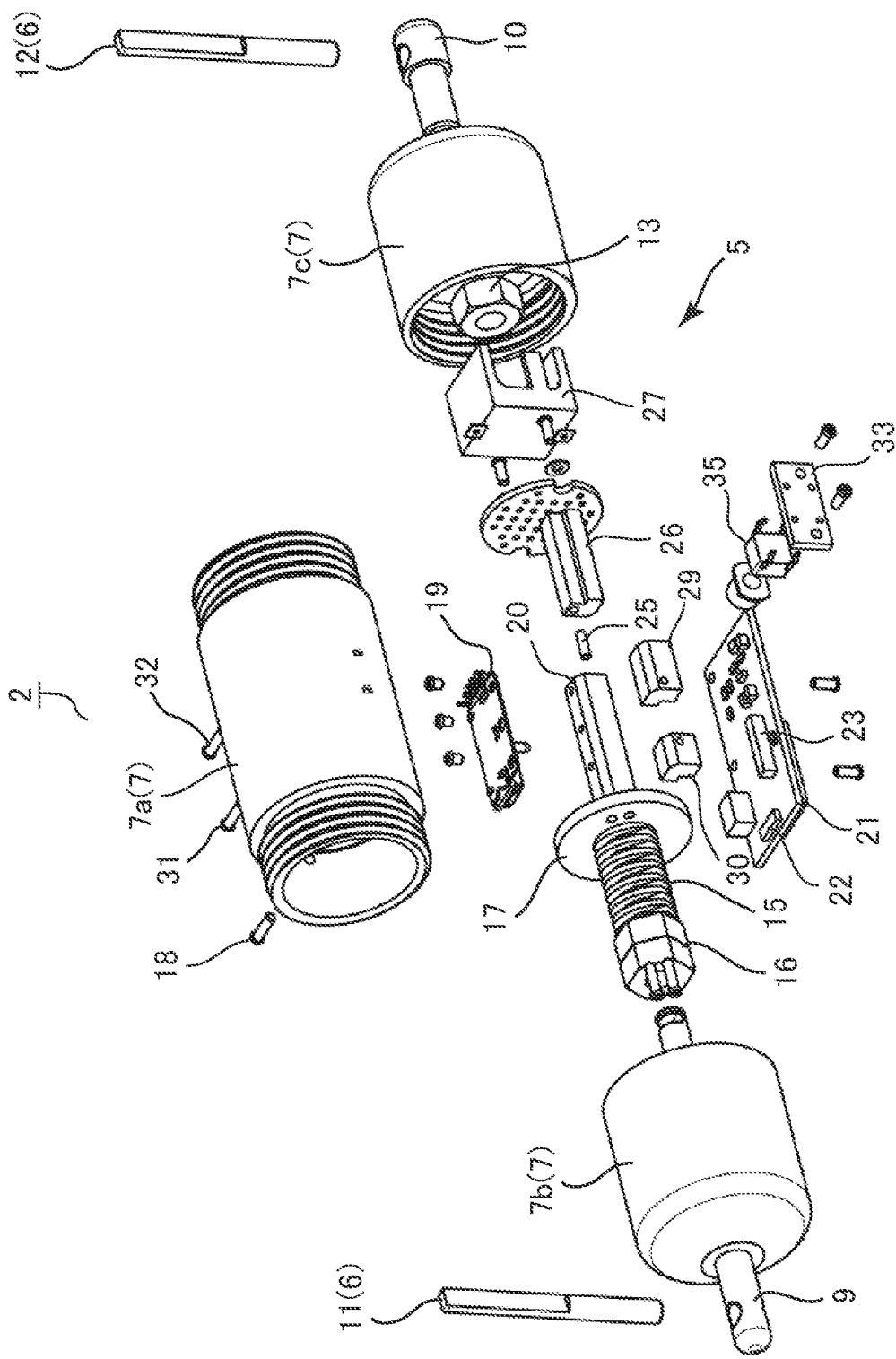
FIG. 2 is an exploded view of the chain measurement device according to the embodiment of the present invention.

As illustrated in FIG. 2, the chain measurement device 2 includes a main body portion 5 and an attachment portion 6 for attaching the main body portion 5 to the chain 4. The main body portion 5 includes a cylindrical casing 7, and a slide shaft 9 and a fixing shaft 10 protrude from both end portions of the casing 7. More specifically, the casing 7 includes a main body 7a and left and right end caps 7b and 7c, and the slide shaft 9 and the fixing shaft 10 described above protrude from the end caps 7b and 7c, respectively.

Among the slide shaft 9 and the fixing shaft 10, the fixing shaft 10 is fixed to the end cap 7c with a bolt 13. The slide shaft 9 is slidably supported by the end cap 7b and a stopper 17. The stopper 17 is a fixing member fixed to the main body 7a with a screw 18. Further, a stopper nut 16 is attached to the slide shaft 9, and a coil spring 15 as an urging member is provided between the stopper nut 16 and the stopper 17. The slide shaft 9 is urged outward by the coil spring 15.

Further, probe pins 11 and 12 constituting the attachment portion 6 described above are attached to the slide shaft 9 and the fixing shaft 10 in a direction intersecting the axis of the shaft. The probe pins 11 and 12 are configured to be inserted between the rollers of the chain 4. Then, each of the probe pins 11 and 12 is inserted between the rollers of the chain 4 and pressed against the outer diameter of the roller by the urging force of the coil spring 15, whereby the chain measurement device 2 is attached to the chain 4.

A bracket 20 is integrally formed with the stopper 17. The internal configuration of the casing 7 is formed into a sub-assembly around the stopper 17 and the bracket 20, and a position sensor 19 is attached to the bracket 20. Further, a substrate 21 is attached to the bracket 20, and the substrate 21 is provided with an acceleration sensor 22 and a communication module 23 for performing wireless communication with the terminal device 3. In the present embodiment, a resistive position sensor is mounted as the position sensor 19, a MEMS acceleration sensor is mounted as the acceleration sensor 22, and a Bluetooth (registered trademark) communication module is mounted as the communication module 23.

In addition, a power supply bracket 26 is integrally attached to the bracket 20 by a knock pin 25, and a battery holder 27 on which a battery (not illustrated) is mounted is attached to the power supply bracket 26.

Brackets 29 and 30 for a power button are fixed to the main body 7a of the casing 7 by screws 31 and 32, and a switch substrate 33 is attached to the brackets 29 and 30. The switch substrate 33 is provided with a power switch 35 including a tact switch, and the chain measurement device 2 is turned on/off by a user pressing the power switch 35.

Detailed Configuration Around Attachment Portion

Next, a detailed configuration around the attachment portion for attaching the chain measurement device 2 to the chain 4 will be described. First, a guide function of the casing 7 will be described. As illustrated in FIG. 1, in the chain 4 wound around a sprocket 51 on a drive side and a sprocket 52 on a driven side, an upper side is a tensioned side 42 with high tension, and the lower side is a slack side 41 with low tension. Unlike the tensioned side 42, the slack side 41 is not covered with a chain case or the like, and thus is easily accessed by the user, but is curved downward (so-called catenary curve).

Figure 3A:
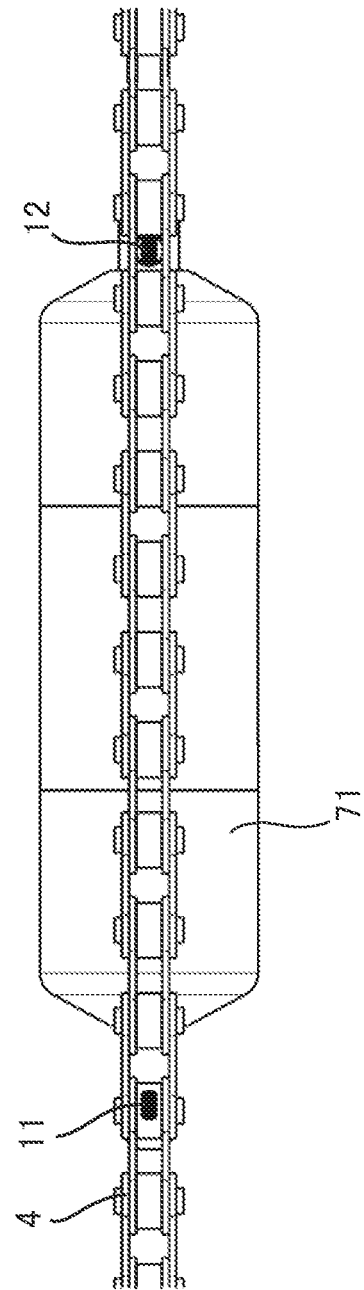
FIG. 3A is a plan view illustrating the chain measurement device attached to a chain.

For this reason, in a case where the acceleration sensor is simply attached to the slack side 41 of the chain 4, the acceleration sensor may tilt due to the curve of the chain 4 and affect the measurement accuracy. Even in the case of measuring the elongation of the chain 4, it is difficult to accurately measure the length of the chain in a case where the chain 4 is curved. Therefore, in the present embodiment, as illustrated in FIGS. 3A and 3B, tension is applied to the chain 4 between the probe pins 11 and 12 by the coil spring 15. As a result, even on the slack side 41 of the chain 4, a predetermined tension can be applied between the probe pins 11 and 12 by the urging force of the coil spring 15 to stretch the chain 4, and catenary (curvature) of the chain 4 can be suppressed.

In addition, in a case where the chain measurement device 2 is attached, the probe pins 11 and 12 are inserted between the rollers of the chain 4 until the upper surface 71 of the casing 7 abuts on an outer periphery of the chain 4, so that the upper surface 71 of the casing 7 serves as a guide surface to allow the posture of the main body portion 5 to follow the chain 4 between the probe pins 11 and 12 described above. As a result, it is possible to suppress the inclination of the main body portion 5 incorporating the acceleration sensor 22.

Next, shapes of distal end portions 11t and 12t of the probe pins 11 and 12 will be described. The distal end portions 11t and 12t of the probe pins 11 and 12 have substantially the same shape in the probe pin 11 and the probe pin 12, and thus, only the shape of the distal end portion 12t of the probe pin 12 will be described below.

As illustrated in FIGS. 2 and 3B, the probe pin 12 has a circular cross-sectional shape at a base portion 12b press-fitted into a hole formed at an end portion of the fixing shaft 10, and has a heteromorphic cross-sectional shape at the distal end portion 12t inserted between rollers of the chain 4.

Figure 3C:
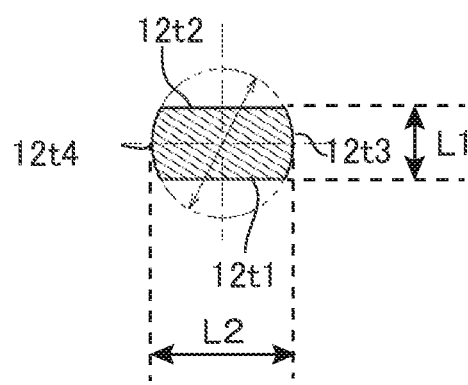
FIG. 3C is a cross-sectional view of a probe pin.

More specifically, as illustrated in FIG. 3C, the distal end portion 12t of the probe pin 12 is formed to be cut out so that side surfaces 12t1 and 12t2 facing a link plate of the chain 4 become flat surfaces in a state of being inserted between the rollers of the chain 4. Further, surfaces 12t3 and 12t4 of the chain 4 in contact with the rollers are formed to be curved surfaces. As a result, the cross-sectional shape of the distal end portion 12t is formed such that a length L1 in a first direction corresponding to a width direction of the chain 4 in a case where the distal end portion is inserted between the rollers of the chain 4 is shorter than a length L2 in a second direction corresponding to a traveling direction of the chain 4.

Therefore, for example, the chain measurement device 2 can be attached to a wide chain from a chain with a narrow interval between link plates of the chain like a bicycle chain to a chain with a wider interval between link plates than a bicycle chain like a motorcycle chain. In addition, by making the length L2 in the second direction to which the tension of the coil spring 15 is applied longer than the length L1 in the first direction, stiffness of the probe pin 12 is secured, and deflection of the probe pin 12 is suppressed. In addition, since the surface 12t4 in contact with the roller of the chain 4 is formed by the curved surface, the roller of the chain 4 and the probe pin 12 are in point contact with each other, and the measurement accuracy can be improved.

Detailed Configuration of Chain Elongation Measurement Mechanism

Figure 4:
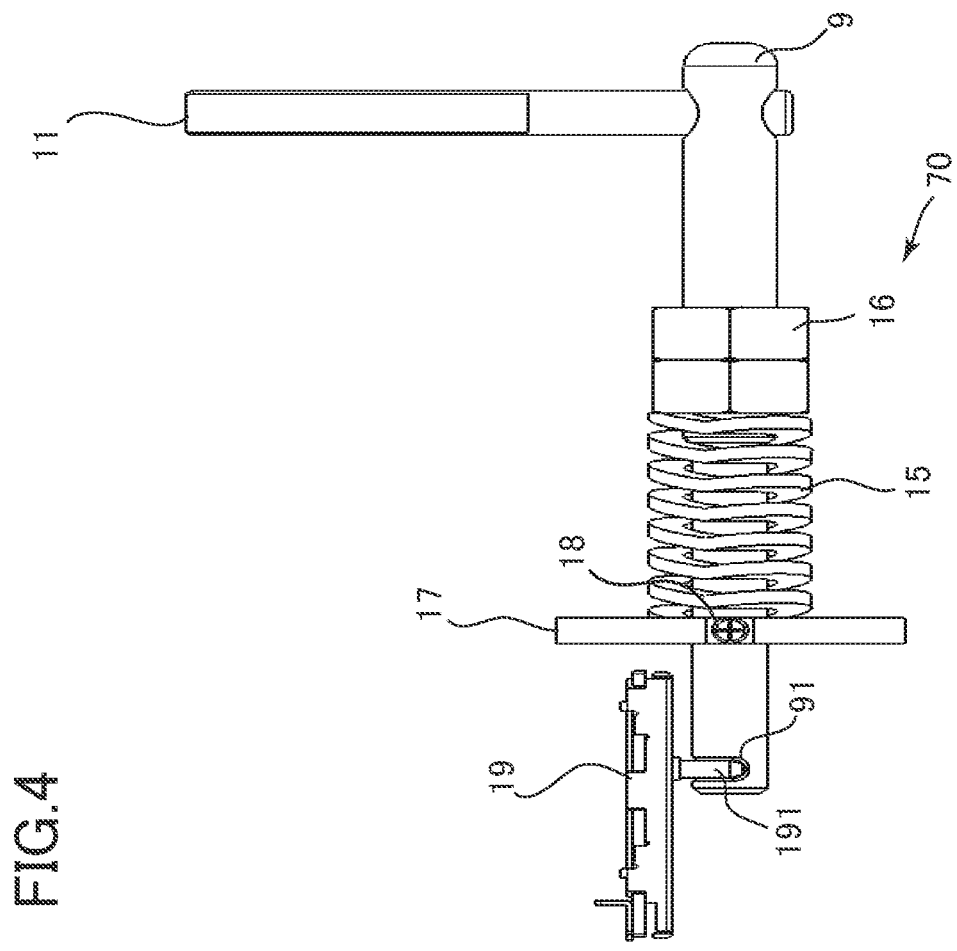
FIG. 4 is a schematic view illustrating a position sensor.
Figure 4:
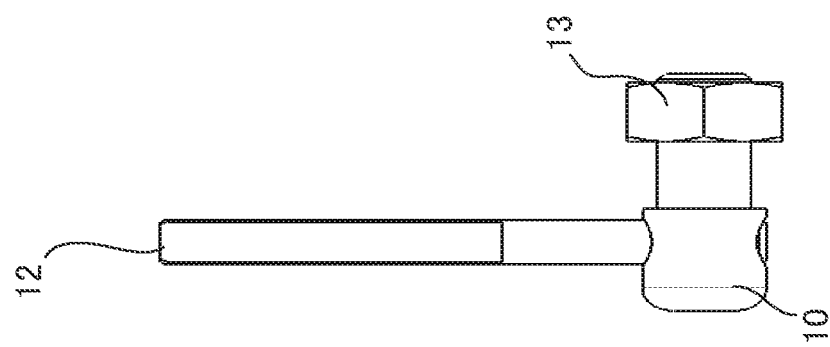

Next, a chain elongation measurement mechanism using the position sensor 19 will be described with reference to FIGS. 2 and 4. As illustrated in FIG. 4, the position sensor 19 is configured such that a sensor lever 191 is fitted into an attachment groove 91 of the slide shaft 9, and detects the position of the probe pin 11 by the sensor lever 191 moving together with the slide shaft 9.

Here, as described above, the position sensor 19 and the slide shaft 9 form a sub-assembly via the bracket 20 (see FIG. 2). In a case where the sub-assembly is assembled in the casing 7, the stopper nut 16 attached to the slide shaft 9 is pressed against the end cap 7b, so that the coil spring 15 is compressed more than the natural length. Meanwhile, in a state before being assembled in the casing 7, the position of the stopper nut 16 is not restricted by the end cap 7b. In a case where the position of the attachment groove 91 of the slide shaft 9 is located axially outside the movement range of the sensor lever 191 in a natural state of the coil spring 15, if the sensor lever 191 is engaged with the attachment groove 91 of the slide shaft 9 at the time of assembling the sub-assembly, a reaction force from the coil spring 15 is applied to the sensor lever 191 before the sub-assembly is assembled in the casing 7.

Therefore, in the present embodiment, the position sensor 19 is attached to the bracket 20 such that the position of the attachment groove 91 of the slide shaft 9 in a case where the coil spring 15 has a natural length is located within the movable range of the sensor lever 191 or in the vicinity of the movable range of the sensor lever 191 (for example, distance between the attachment groove 91 and the end portion of the movable range of the sensor lever 191 on the attachment groove 91 side is within 2 mm).

As a result, at the time of assembling the sub-assembly, it is not necessary to fit the sensor lever 191 of the position sensor 19 into the attachment groove 91 of the slide shaft 9 in a state where the slide shaft 9 is pushed by the finger, or the pushing amount of the slide shaft 9 is reduced, so that assimilability of the sub-assembly is improved. In addition, the load applied to the sensor lever 191 can be reduced in a state where the sub-assembly is assembled.

Configuration of Terminal Device

Figure 5:
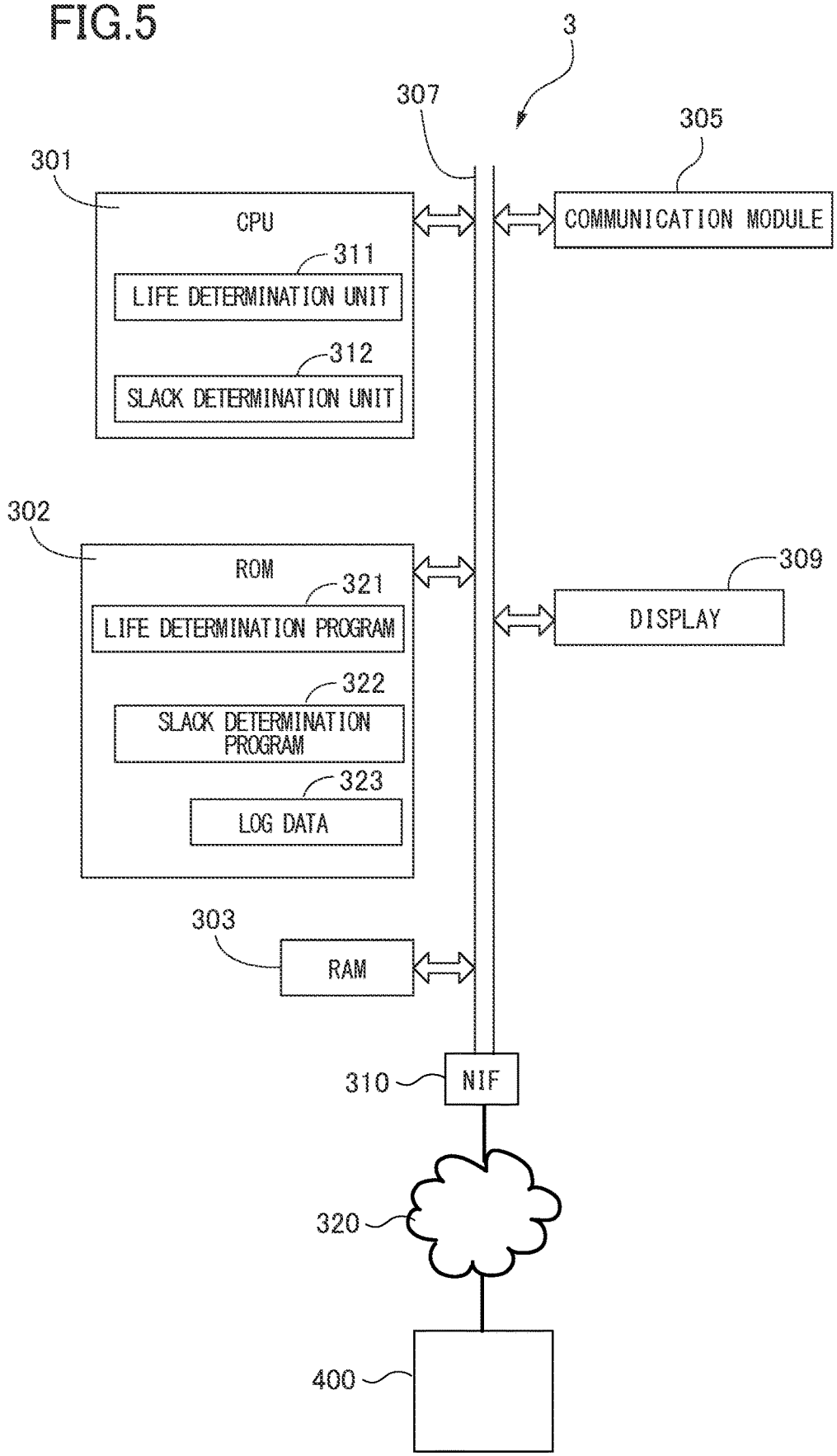
FIG. 5 is a block diagram of a terminal device.

Next, a configuration of the terminal device 3 will be described. As illustrated in FIG. 5, the terminal device 3 of the present embodiment is a portable computer such as a smartphone, and includes a CPU 301 as a calculation unit, and a ROM 302 and a RAM 303 constituting a storage unit. In addition, the terminal device 3 includes a communication module 305 capable of communicating with the chain measurement device 2, a display 309, and a network interface 310. The CPU 301, the ROM 302, the RAM 303, the communication module 305, the display 309, and the network interface 310 are communicably connected to each other by a bus 307.

The ROM 302 stores a life determination program 321 for determining the life of the chain 4 and a slack determination program 322 for determining the slack of the chain 4 based on the measurement result of the chain measurement device 2 described above, and the CPU 301 executes the life determination program 321 and the slack determination program 322 to execute life determination processing and slack determination processing for the chain 4. In the present embodiment, the life determination program 321 and the slack determination program 322 constitute a chain measurement application executed in the terminal device 3. The terminal device 3 can download such a chain measurement application from the server device 400 via the Internet 320 via the network interface 310. The network interface 310 can be configured using, for example, a communication standard by wired communication such as IEEE 802.3 or wireless communication such as IEEE 802.11 or 802.15. In addition, the server device 400 is configured by a computer including a storage device and a calculation unit that store the life determination program 321 and the slack determination program 322.

Life Determination Processing

Figure 6:
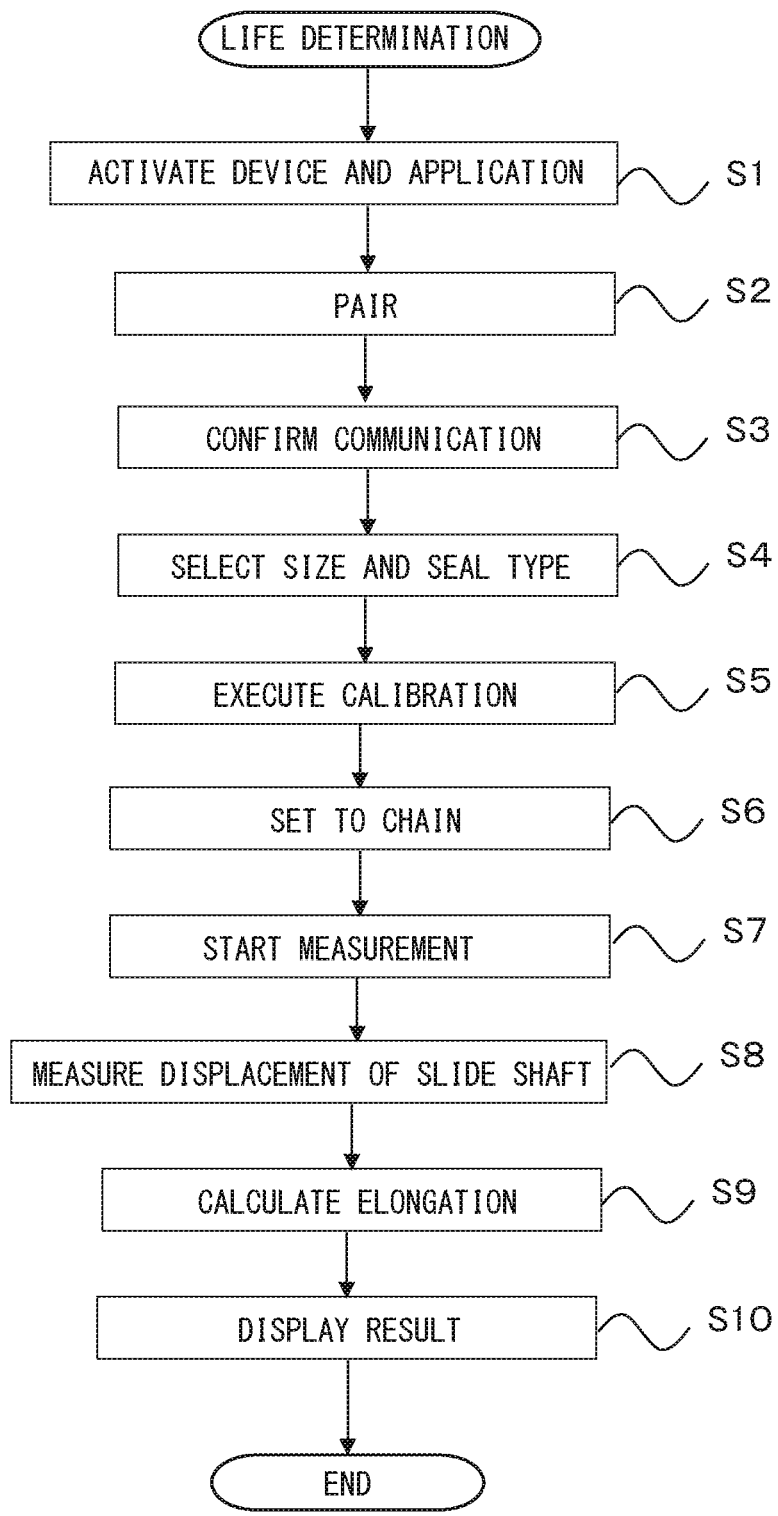
FIG. 6 is a flowchart illustrating life determination processing of the chain.

Next, chain life determination processing will be described with reference to FIGS. 5 and 6. In a case where the above-described life determination program 321 is executed, the CPU 301 functions as a life determination unit 311 that determines the life from the elongation of the chain 4, and executes the life determination processing. Specifically, as illustrated in FIG. 6, in a case of executing the chain life determination processing, the user first turns on the power switch 35 of the chain measurement device 2 and activates the chain measurement application including the life determination program 321 in the terminal device 3 (Step S1 in FIG. 6).

Next, in a case where the chain measurement application of the chain measurement device 2 and the terminal device 3 is activated, the chain measurement device 2 and the terminal device 3 are paired (S2). In a case where the chain measurement device 2 and the terminal device 3 are paired, the user pushes the slide shaft 9 of the chain measurement device 2 into the casing 7. In a case where the slide shaft 9 is pushed in, the terminal device 3 acquires an initial value from the chain measurement device 2, and it is confirmed whether communication between the terminal device 3 and the chain measurement device 2 is normally performed (S3).

Then, in a case where it is confirmed that the communication is normal, the user operates the terminal device 3 to select the type of the chain to be measured. In the present embodiment, a suitable chain size and seal type are selected from a plurality of selectable chain sizes and seal types (S4). Then, in a case where the size and the seal type of the chain 4 are selected, the terminal device 3 is operated in a state where the slide shaft 9 of the chain measurement device 2 is released (a state where the slide shaft 9 is not pushed) to execute calibration (S5). By performing the calibration, an initial position (hereinafter, referred to as a calibration value) of the probe pin 11 in the released state is calibrated, and the result is communicated to the terminal device 3.

In a case where the calibration is completed, an LED 40 (see FIG. 3B) as a display device of the chain measurement device 2 lights up red, and the user attaches the chain measurement device 2 to the chain 4 in this state (S6). Specifically, the user pushes the slide shaft 9 to attach the chain measurement device 2 to the chain 4 such that the number of links between the probe pins 11 and 12 becomes a prescribed number of links. In the present embodiment, the completion of the calibration is notified by turning on the LED 40. However, for example, the completion of the calibration may be notified by displaying the completion of the calibration on the display of the terminal device 3. In addition, it may be notified that the chain measurement device 2 is powered on by turning on the LED 40.

Then, in a case where the chain measurement device 2 is attached to the chain 4, the user operates the terminal device 3 (for example, a tap on the display 309) to start measurement (S7). In a case where the measurement of the position (hereinafter, referred to as an actual measured value) of the probe pin 11 is completed (S8), the measured data is communicated from the chain measurement device 2 to the terminal device 3.

In a case where the measurement result is communicated from the chain measurement device 2, the terminal device 3 acquires a zero correction value from the size and type information of the chain selected in Step S4, calculates a difference between the actual measured value and the calibration value corrected by the zero correction value, and sets the difference as an elongation amount (displacement) of the chain 4 (S9).

Note that the above-described zero correction value is a value representing a difference between the position of the probe pin 11 in design in a case where there is no chain elongation and the initial position where the calibration is performed, and is different for each type of chain. Therefore, the position of the probe pin 11 in design in a case where there is no chain elongation can be obtained by correcting the calibration value with the zero correction value, and the elongation amount of the chain 4 can be obtained by obtaining a difference between the actual measured value and the calibration value corrected with the zero correction value.

In a case where the elongation amount of the chain 4 is obtained, the terminal device 3 calculates the elongation rate which is a ratio of the elongation amount to a reference length of the selected chain 4, and determines the life of the chain based on the value of the elongation rate. Then, a result related to the determined chain life is displayed on the display 309 of the terminal device 3, and the terminal device 3 communicates the determination result to the chain measurement device 2 (S10). In the present embodiment, the elongation rate of the chain is displayed on the display 309, and a diagnosis result of chain life is displayed in three stages of "chain is good", "chain replacement time is approaching", and "chain replacement is recommended".

In a case of receiving the determination result, the chain measurement device 2 turns on the LED 40 to notify the user of the determination result. The threshold of the elongation rate of the chain for determining the life of the chain is set to a different value according to the type of chain. In addition, the diagnosis result of the chain life may be indicated on the display 309 by colors other than characters, and for example, the chain life may be indicated on the display 309 by percentage display.

Slack Determination Processing

Figure 7:
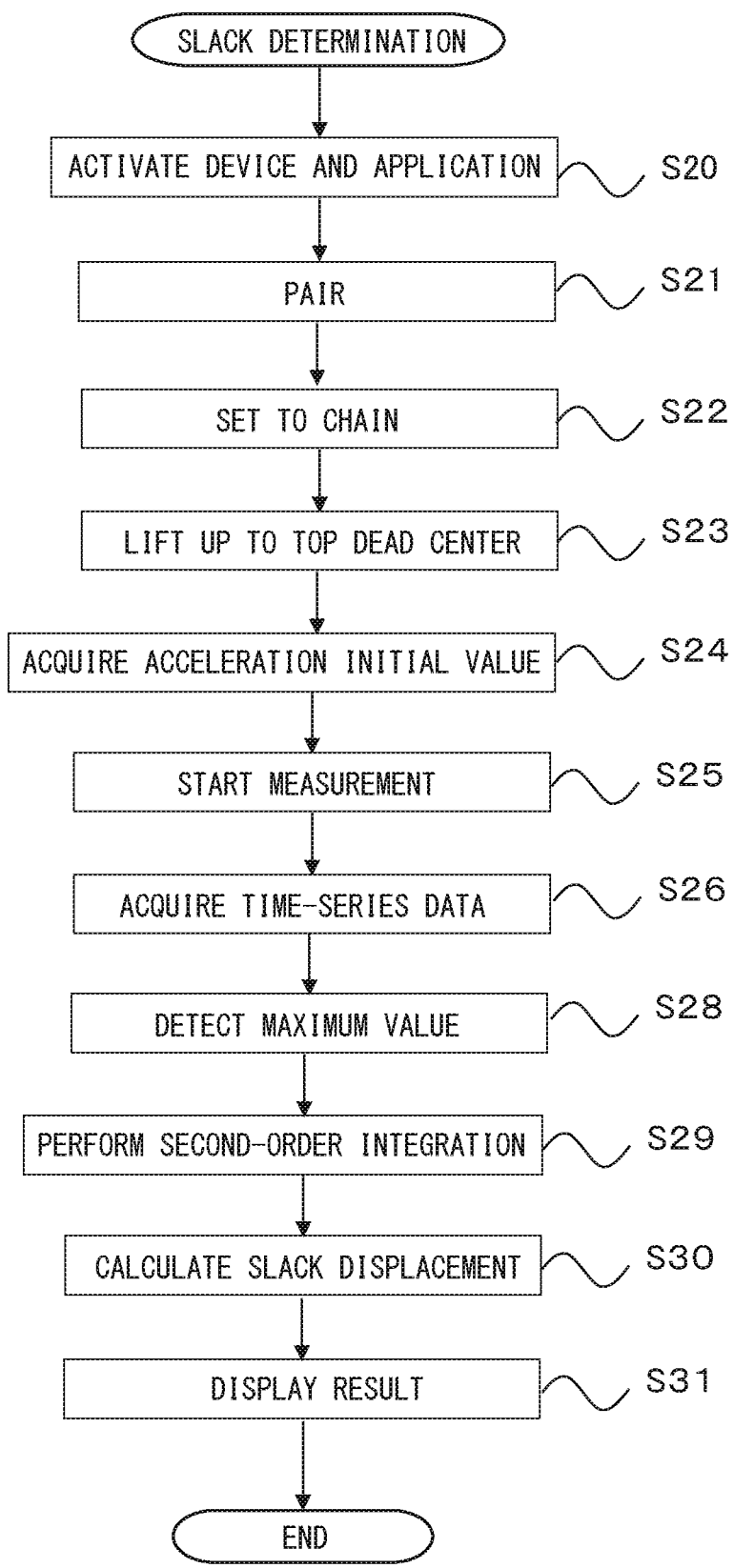
FIG. 7 is a flowchart illustrating slack determination processing of the chain.

Next, the slack determination processing of the chain will be described with reference to FIGS. 5 and 7 to 8D. In a case where the above-described slack determination program 322 is executed, the CPU 301 functions as a slack determination unit 312 that determines whether the slack of the chain 4 is within an appropriate range, and executes the slack determination processing. Specifically, as illustrated in FIG. 7, in a case of executing the slack determination processing of the chain, the user turns on the power switch 35 of the chain measurement device 2 and activates the chain measurement application including the slack determination program 322 in the terminal device 3 (Step S20 in FIG. 7).

Then, in a case where the chain measurement application on the side of the chain measurement device 2 and the terminal device 3 is activated, the chain measurement device 2 and the terminal device 3 are paired (S21). In a case where the chain measurement device 2 and the terminal device 3 are paired, the user attaches the chain measurement device 2 to the chain 4 (S22, FIGS. 8A to 8B).

Figure 8A:
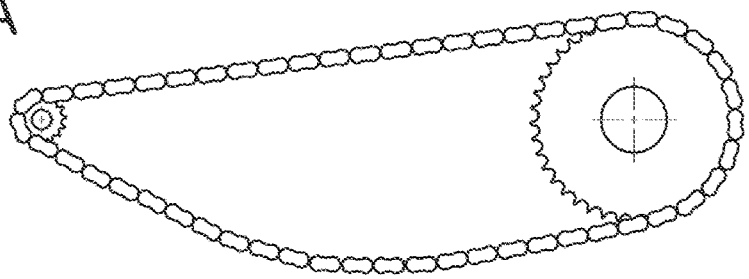
FIG. 8A is a schematic view illustrating an operation at the time of determining the slack of the chain, and is a view illustrating a state before the chain measurement device is attached.
Figure 8B:
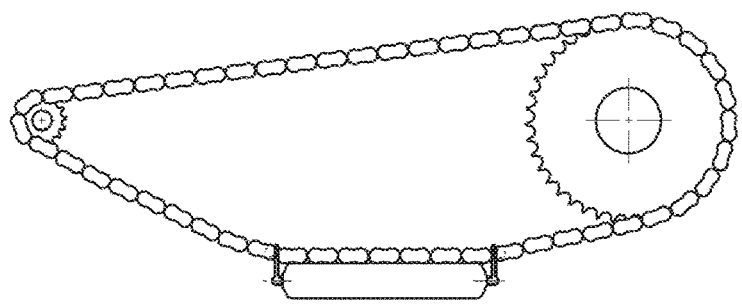
FIG. 8B is a schematic view illustrating the operation at the time of determining the slack of the chain, and is a view illustrating a state in which the chain measurement device is attached.
Figure 8C:
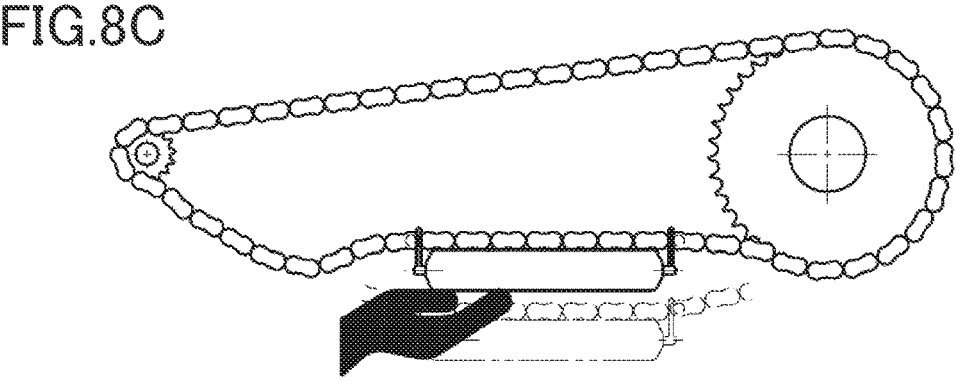
FIG. 8C is a schematic view illustrating the operation at the time of determining the slack of the chain, and is a view illustrating a state in which the chain measurement device is lifted upward.

In a case where the chain measurement device 2 is attached to the chain 4, the user lifts the chain measurement device 2 up to a top dead center as illustrated in FIG. 8C (S23). In a case where the chain measurement device 2 is lifted up to the top dead center, the acceleration in the XYZ axis direction at the top dead center is communicated as an initial value from the chain measurement device 2 to the terminal device 3 (S24). This initial value is used for horizontal correction of acceleration in the Z-axis direction.

Figure 8D:
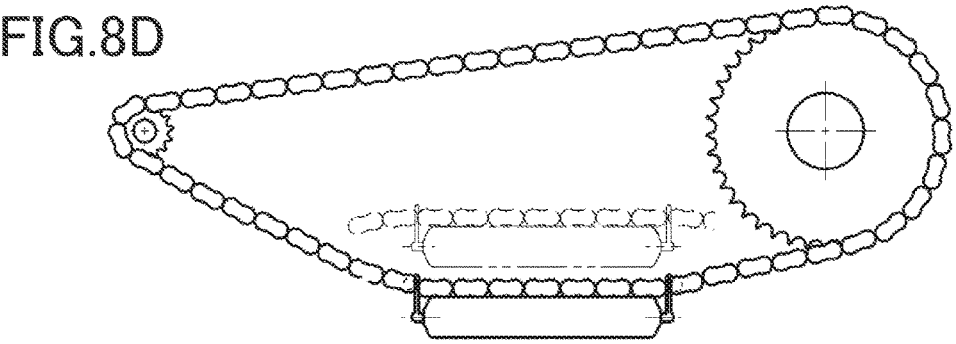
FIG. 8D is a schematic view illustrating the operation at the time of determining the slack of the chain, and is a view illustrating a state in which the chain measurement device is dropped.

In a case where the initial value of the acceleration is acquired, the user operates the terminal device 3 (for example, a tap on the display 309), starts the measurement, and releases the hand from the chain measurement device 2 to drop the chain measurement device 2 (S25, see FIG. 8D). In a case where the measurement is started in Step S25, the acceleration sensor 22 of the chain measurement device 2 measures the acceleration in the Z-axis direction (gravitational direction) for a predetermined time (for example, a maximum of 0.5 sec in the present embodiment) and transmits the acceleration to the terminal device 3 (S26).

The measured value of the acceleration transmitted from the chain measurement device 2 is stored as time-series data of the acceleration in the storage units 302 and 303 of the terminal device 3, and the CPU 301 of the terminal device 3 detects the maximum value of the acceleration in the time-series data (S28).

In case where the maximum value of the acceleration is detected, it is assumed that the chain measurement device 2 has reached the bottom dead center when the acceleration takes the maximum value (the state of FIG. 8D), and the CPU 301 of the terminal device 3 performs second-order numerical integration of the acceleration in the Z direction between the start value and the maximum value (S29), and sets the value of the acceleration in the Z direction obtained by the second-order numerical integration as an estimated value of the slack amount (slack displacement) of the chain 4 (S30).

Then, the CPU 301 of the terminal device 3 determines whether or not the calculated slack amount of the chain 4 is within an appropriate slack range stored in the storage units 302 and 303, and displays the determination result on the display 309. For example, in the present embodiment, if the calculated slack amount is within the appropriate range, "within the appropriate range" is displayed. In a case where the calculated slack amount is out of the appropriate range on the side where the slack is small, "chain is too tight, please loosen" is displayed together with the determination result on the display 309. Further, in a case where the calculated slack amount is out of the appropriate range on the side where the slack is large, "chain is too slack, please increase tension" is displayed together with the determination result on the display 309. In addition, the terminal device 3 communicates the determination result to the chain measurement device 2, and notifies the user of the result using the LED 40 of the chain measurement device 2 (S31).

SUMMARY

As described above, according to the present embodiment, there is provided a chain measurement device (2) for measuring a slack amount of a chain (4) wound around sprockets (51, 52), the chain measurement device (2) including:

a main body portion (5) including an acceleration sensor (22) configured to detect acceleration in a gravitational direction; and an attachment portion (6) configured to attach the main body portion (5) to the chain (4), in which wherein the acceleration sensor (22) is configured to detect acceleration in the gravitational direction in a case where the main body portion (5) attached to the chain (4) is lifted upward within a range of a slack amount of the chain (4) and then dropped.

As described above, the chain measurement device 2 incorporating the acceleration sensor 22 is attached to the chain 4, and the chain measurement device 2 is lifted upward within the range of the slack of the chain 4 and dropped, whereby a response value of the acceleration when the chain measurement device 2 is dropped within the range of the slack can be acquired. Then, the slack amount of the chain 4 can be calculated by performing second-order numerical integration on the time-series data of the acceleration. According to such a method, it is possible to measure the slack amount of the chain 4 only by lifting and dropping the chain measurement device 2, to simplify the measurement of the slack amount of the chain 4, and to reduce an error between measuring operators.

The attachment portion (6) is configured to attach the main body portion (5) to the chain (4) having an endless shape, the main body portion (5) includes a casing (7) extending in a traveling direction of the chain (4) in a case of being attached to the chain (4), and the casing (7) has a guide surface configured to abut on the chain (4) in a case where the main body portion (5) is attached to the chain (4) by the attachment portion (6).

As described above, by using the casing 7 as the guide surface that abuts on the chain, in a case where the chain measurement device 2 is attached to the chain 4, the main body portion 5 incorporating the acceleration sensor 22 can be attached to the chain 4 without being inclined as much as possible, and the measurement accuracy by the acceleration sensor 22 can be improved.

The main body portion (5) includes
a first shaft (9) that protrudes from a first end in an extending direction of the casing (7) and is slidably supported,
a second shaft (10) that protrudes from a second end opposite to the first end in the extending direction of the casing (7), and
an urging member (15) that urges the first shaft (9) in a direction in which the first shaft (9) protrudes from the casing (7),
the attachment portion (6) includes
a first member (11) that extends from the first shaft (9) in a direction intersecting an axial direction of the first shaft (9),
a second member (12) that extends from the second shaft (10) in a direction intersecting an axial direction of the second shaft (10), and
the main body portion (5) is attached to the chain (4) by inserting the first and second members (11, 12) between the rollers of the chain (4) at different positions in the traveling direction.

Therefore, even in the chain measurement device 2 attached to the slack side of the chain 4, an appropriate tension can be applied between the first and second members 11 and 12 by the urging member 15. In addition, since the upper surface 71 of the casing 7 is the guide surface, it is possible to suppress the inclination of the main body portion 5 at the time of attachment.

In the present embodiment, the urging member 15 is configured using the coil spring, but any type of elastic member may be used as long as an appropriate tension can be applied to the chain 4, and the first and second members 11 and 12 may not necessarily be configured by probe pins. In the present embodiment, the upper surface 71 is used as the guide surface, but the lower surface 72 (see FIG. 3B) may be used as the guide surface. In this case, the probe pins 11 and 12 are attached to the shafts 9 and 10 so as to extend in the gravitational direction (downward), and the main body portion 5 is attached to the chain from the upper side (inner peripheral side). Further, the shafts 9 and 10, the urging member 15, the first member 11, and the second member 12 may be omitted, and a fastening member such as a magic band may be provided in the casing 7 as the attachment portion (6) to fix the casing 7 to the chain.

The main body portion (5) includes a detection sensor (19) for detecting an elongation amount of the chain (4) based on a distance between the first member (11) and the second member (12).

As described above, by providing the detection sensor 19, it is possible to easily and accurately measure not only the slack amount of the chain 4 but also the elongation of the chain 4 using the chain measurement device 2. In particular, since the elongation of the chain 4 can be measured in a state where tension is applied to the chain 4 by the urging member 15 and the catenary of the chain 4 is also suppressed by the guide surface 71 of the casing 7, the elongation of the chain can be accurately measured. In the present embodiment, the detection sensor is constituted by the position sensor 19 that detects the position of the probe pin 11 as the first member. However, the detection sensor may be constituted by, for example, a sensor that detects the distance between the probe pins 11 and 12.

Each of the first member (11) and the second member (12) has a distal end portion (11t, 12t) inserted between the rollers of the chain (4), and
in each of distal end portions (11t, 12t) of the first member (11) and the second member (12),
in a case where a direction corresponding to a width direction of the chain (4) when the distal end portion (11t, 12t) is inserted between the rollers of the chain is defined as a first direction and a direction corresponding to the traveling direction of the chain (4) when the distal end portion (11t, 12t) is inserted between the rollers of the chain (4) is defined as a second direction,
a length (L1) in the first direction is shorter than a length (L2) in the second direction in a cross-sectional shape of the distal end portion.

In this manner, by narrowing the widths in the first direction of the distal end portions (11t, 12t) of the first member (11) and the second member (12), the chain measurement device 2 can be attached to even a chain having a narrow chain width such as a bicycle chain, for example.

Further, in the present embodiment, there is provided a chain measurement system (1) including: the above-described chain measurement device (2): and a computer (3) configured separately from the chain measurement device (2),
in which the chain measurement device (2) includes a communication module (23) configured to communicate with the computer (3), and
the terminal device (3) includes:
a storage unit (302,303) configured to store time-series data of acceleration in the gravitational direction detected by the acceleration sensor (22) in a case where the main body portion (5) is lifted upward within the range of the slack amount of the chain (4) and then dropped, and
a calculation unit (301) configured to calculate the slack amount of the chain (4) based on the time-series data of the acceleration stored in the storage unit (302,303).

As described above, the chain measurement device 2 that measures the acceleration and the computer 3 that calculates the slack amount of the chain based on the time-series data of the acceleration measured by the chain measurement device 2 are configured separately, so that the chain measurement device 2 can be manufactured at low cost. In addition, on the terminal device 3 side, log data 323 such as the slack amount measured in the past can be held in the storage unit, and the transition of the state of the chain can be easily checked.

In addition, since the calculation unit 301 of the computer 3 can also calculate the elongation of the chain on based on the detection result of the detection sensor 19, it is possible to integrally measure and manage the slack amount and the elongation amount of the chain 4 by the single terminal device 3. Note that the computer 3 may be configured by a desktop terminal or the like in addition to the smartphone. Furthermore, the computer may be configured by a server device 400 capable of communicating with the terminal device 3 in addition to the terminal device such as the smartphone or the desktop terminal described above. For example, the server device 400 may acquire measurement data (time-series data of acceleration and data related to the elongation amount of the chain 4) of the chain measurement device 2 via the terminal device 3. Then, the server device 400 may cause the calculation unit to calculate data related to the slack amount of the chain and the elongation amount of the chain on based on the life determination program 321 and the slack determination program 322 stored in the storage unit. In this case, the result calculated by the server device 400 is communicated to the terminal device 3 and displayed to the user. The chain measurement device 2 may indirectly communicate with the server device 400 via the terminal device 3, or may directly communicate with the server device 400 by accessing an internetwork. As described above, in the present embodiment, it is assumed that the chain measurement device 2 can communicate with the computer 400 by the communication module regardless of whether the communication is indirect or direct communication. Further, various types of log information may also be stored in the server device 400.

According to the present embodiment, there is provided a method for calculating the slack amount of the chain (4), and the computer (3) executes the following processing.

a) acquiring time-series data of acceleration in a gravitational direction detected in a case where an acceleration sensor (22) attached to the chain (4) is lifted upward within a range of a slack amount of the chain (4) and then dropped.

b) performing second-order numerical integration on a predetermined range of the acquired time-series data of the acceleration in the gravitational direction, and calculating the slack amount of the chain (4).

In this manner, the slack amount of the chain 4 can be calculated by performing second-order numerical integration on the time-series data of the acceleration in the gravitational direction.

There is provided a computer program (322) for causing a computer to execute the method for calculating a slack amount of the chain (4).

As described above, by configuring the method for calculating the slack amount of the chain (4) as the computer program 322, for example, the method for calculating the slack amount can be implemented in the form of an application of a smartphone. In the present embodiment, the program 322 is stored in the ROM 302 which is an example of a computer-readable recording medium.

Figure 9:
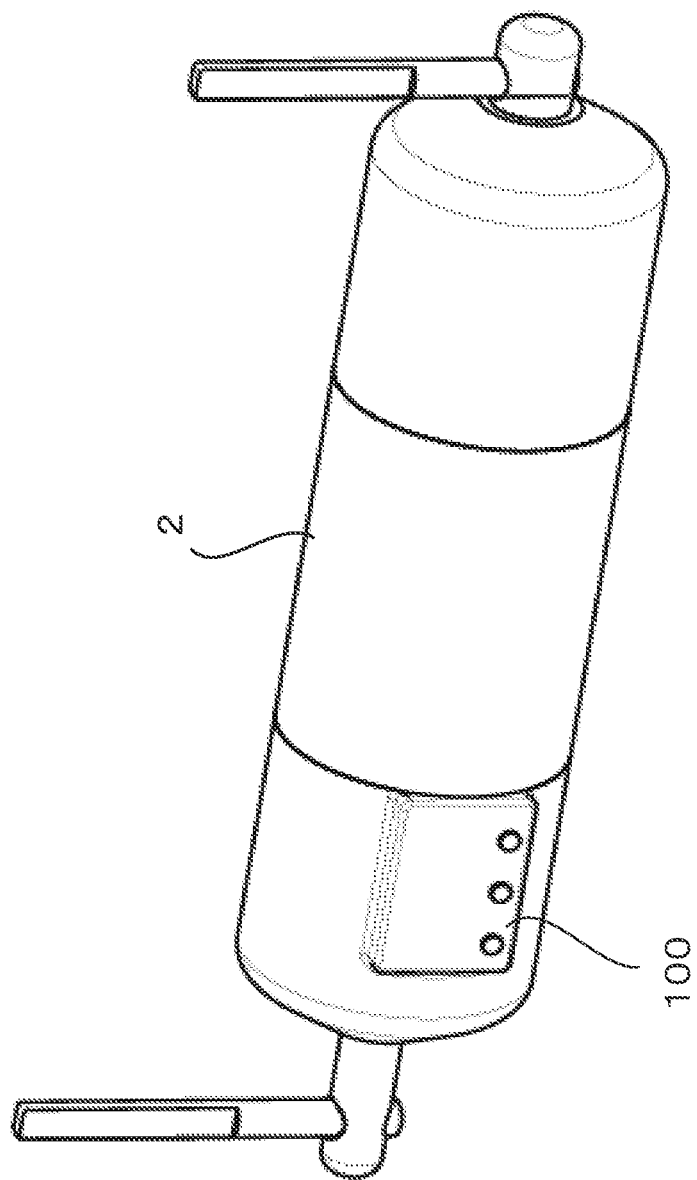
FIG. 9 is a view illustrating a modification of the chain measurement device.

Furthermore, in the above-described embodiment, the chain measurement device 2 and the terminal device 3 are provided separately, but for example, the calculation unit 301 and the storage units 302 and 303 of the terminal device 3 may be provided on the chain measurement device 2 side. In this case, as a display device for displaying the calculated slack amount and the elongation of the chain, the chain measurement device 2 desirably includes a display 100 as illustrated in FIG. 9. The chain measurement device 2 may include the display 100 even when calculating the slack amount of the chain 4 and the elongation of the chain 4 using the terminal device 3. In addition, the inventions described in the above-described embodiments may be combined in any way.

Embodiments of the present invention can also be implemented by a computer of a system or apparatus including one or more circuits (for example, an application specific integrated circuit (ASIC)) for reading and executing computer-executable instructions (for example, one or more programs) recorded on a storage medium (this may also be referred to more fully as a "non-transitory computer-readable storage medium") for performing one or more functions of the above-described embodiments, and/or for performing one or more functions of the above-described embodiments. Embodiments of the present invention can also be implemented by, for example, a method in which a computer executable instruction is read from a storage medium and executed by a computer of the system or the apparatus to perform one or more functions of the above-described embodiments and/or the one or more circuits are controlled to perform one or more functions of the above-described embodiments. The computer may be comprised of one or more processors (for example, a central processing unit (CPU) and a microprocessor (MPU)) and may include a separate computer or network of separate processors for reading and executing computer-executable instructions. The computer-executable instructions may be provided to the computer from, for example, a network or storage medium. The storage medium may include, for example, one or more of a hard disk, a random access memory (RAM), a read-only memory (ROM), a storage of a distributed computing system, an optical disc (Compact Disc (CD), Digital Versatile Disc (DVD), Blu-ray Disc (BD)™, or the like), a flash memory device, a memory card, or the like.

INDUSTRIAL APPLICABILITY

The chain measurement device and the method for calculating the slack amount of the chain are suitably used, for example, for measuring the slack amount of a bicycle chain or a motorcycle chain.

While the invention has been described with reference to embodiments, it will be understood that the invention is not limited to the disclosed embodiments. The scope of the following claims should be given the broadest interpretation so as to encompass all such modifications and equivalent structures and functions.

What is claimed is:

1. A chain measurement device for measuring a slack amount of a chain wound around sprockets, the chain measurement device comprising:

a main body portion including a casing, an acceleration sensor, and a communication module configured to communicate with a computer; and an attachment portion configured to attach the main body portion to the chain such that the casing faces the chain in a vertical direction, wherein:

the casing has a shape that extends in a traveling direction of the chain in a case where the main body is attached to the chain;

in a slack determination operation of freely dropping the main body portion attached to the chain from a start position where the main body portion is held and lifted upward within a range of the slack amount of the chain, the acceleration sensor is configured to detect acceleration in a gravitational direction for a predetermined time from a reception of a start signal of the slack determination operation; and the communication module is configured to output, to the computer, information about the acceleration detected by the acceleration sensor in the slack determination operation.

2. The chain measurement device according to claim 1, wherein:

the attachment portion is configured to attach the main body portion to the chain, ends of the chain being structurally connected to define a loop; and the casing has a guide surface configured to abut on the chain in the case where the main body portion is attached to the chain by the attachment portion.

3. The chain measurement device according to claim 2, wherein the main body portion includes:

a first shaft that protrudes from a first end of the casing in an extending direction of the casing, the first shaft being supported by the casing such that the first shaft is slidable;

a second shaft that protrudes from a second end of the casing opposite to the first end of the casing in the extending direction of the casing; and an elastic member configured to urge the first shaft in a direction in which the first shaft protrudes from the casing, wherein the attachment portion includes:

a first member that extends from the first shaft in a direction intersecting an axial direction of the first shaft; and a second member that extends from the second shaft in a direction intersecting an axial direction of the second shaft, and wherein the main body portion is configured to be attached to the chain by respectively inserting the first member and second member into spaces between rollers of the chain at different positions in the traveling direction of the chain.

4. The chain measurement device according to claim 3, wherein the main body portion includes a detection sensor configured to detect an elongation amount of the chain based on a distance between the first member and the second member.

5. The chain measurement device according to claim 3, wherein:

each of the first member and the second member has a distal end portion configured to be inserted between the rollers of the chain; and in a case where a first direction corresponds to a width direction of the chain when the distal end portions of the first member and the second member are inserted between the rollers of the chain, and a second direction corresponds to the traveling direction of the chain when the distal end portions of the first member and the second member are inserted between the rollers of the chain, each of the distal end portions of the first member and the second member has a first length in the first direction which is shorter than a second length in the second direction in a cross-sectional shape of the respective distal end portion.

6. The chain measurement device according to claim 1, further comprising:

a non-transitory computer-readable storage unit configured to store time-series data of the acceleration in the gravitational direction detected by the acceleration sensor in the slack determination operation; and a calculation unit configured to calculate the slack amount of the chain based on the time-series data of the acceleration in the gravitational direction stored in the non-transitory computer-readable storage unit.

7. The chain measurement device according to claim 6, wherein the calculation unit is configured to calculate the slack amount of the chain by performing second-order numerical integration on the time-series data of the acceleration in the gravitational direction detected by the acceleration sensor from a start of the slack determination operation to a point where the acceleration in the gravitational direction takes a maximum value.

8. A chain measurement system, comprising:

the chain measurement device according to claim 1; and the computer, wherein the computer includes:

a non-transitory computer-readable storage unit configured to store time-series data of the acceleration in the gravitational direction detected by the acceleration sensor in the slack determination operation; and a calculation unit configured to calculate the slack amount of the chain based on the time-series data of the acceleration in the gravitational direction stored in the non-transitory computer-readable storage unit.

9. The chain measurement system according to claim 8, wherein the attachment portion is configured to attach the main body portion to the chain, ends of the chain being structurally connected to define a loop, wherein the main body portion includes:

a first shaft that protrudes from a first end of the casing in an extending direction of the casing, the first shaft being supported by the casing such that the first shaft is slidable;

a second shaft that protrudes from a second end of the casing opposite to the first end of the casing in the extending direction of the casing; and an elastic member configured to urge the first shaft in a direction in which the first shaft protrudes from the casing, wherein the attachment portion includes:

a first member that extends from the first shaft in a direction intersecting an axial direction of the first shaft; and a second member that extends from the second shaft in a direction intersecting an axial direction of the second shaft, and wherein the main body portion is configured to be attached to the chain by respectively inserting the first member and the second member into spaces between rollers of the chain at different positions in the traveling direction of the chain.

10. The chain measurement system according to claim 9, wherein:

the main body portion includes a detection sensor configured to detect displacement of a distance between the first member and the second member; and the calculation unit is configured to calculate an elongation amount of the chain based on a detection result of the detection sensor.

11. The chain measurement system according to claim 8, wherein the calculation unit is configured to calculate the slack amount of the chain by performing second-order numerical integration on the time-series data of the acceleration in the gravitational direction detected by the acceleration sensor from a start of the slack determination operation to a point where the acceleration in the gravitational direction takes a maximum value.

12. A method for calculating a slack amount of a chain, the method causing a computer to execute following processing of:

acquiring time-series data of acceleration in a gravitational direction detected in a slack determination operation of freely dropping a main body portion attached to the chain from a start position where the main body portion is held and lifted upward within a range of the slack amount of the chain; and performing second-order numerical integration on a predetermined range of the time-series data of the acceleration in the gravitational direction to calculate the slack amount of the chain.

13. A non-transitory computer-readable recording medium on which a computer program for causing a computer to execute the method according to claim 12 is recorded.

14. The method according to claim 12, wherein the performing of the second-order numerical integration is from a start of the slack determination operation to a point where the acceleration in the gravitational direction takes a maximum value.

* * * * *